United States Patent Office 3,402,107
Patented Sept. 17, 1968

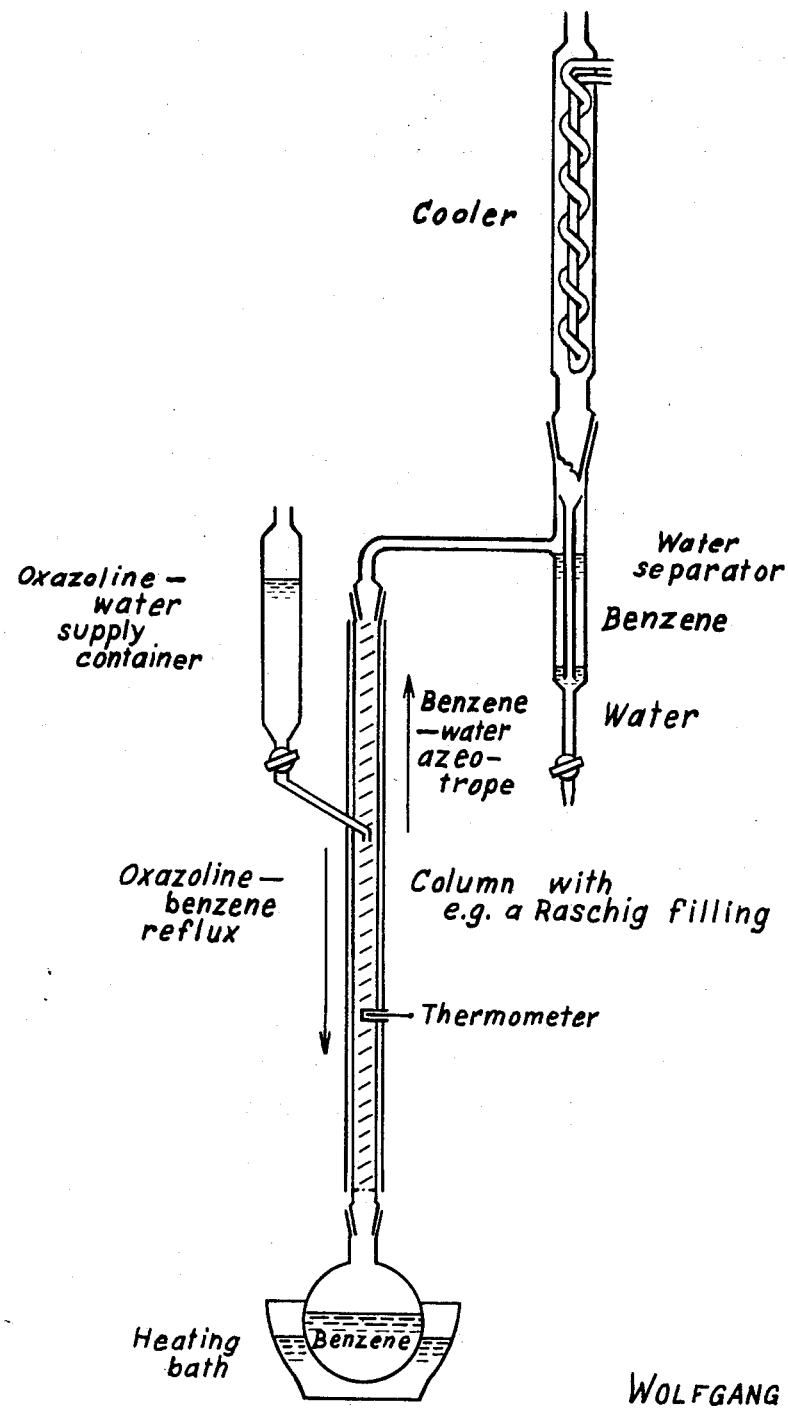

3,402,107
SEPARATING Δ²-OXAZOLINES FROM WATER BY AZEOTROPIC DISTILLATION WITH A WATER ENTRAINER
Wolfgang Seeliger, Marl, and Maria Lutke-Daldrup, Hiddingsel uber Dulmen, Germany, assignors to Chemische Werke Huls Aktiengesellschaft, Marl, Germany, a corporation of Germany
Filed May 10, 1965, Ser. No. 455,049
Claims priority, application Germany, May 22, 1964, C 32,950
8 Claims. (Cl. 203—14)

ABSTRACT OF THE DISCLOSURE

An improvement in the method of separating Δ²-oxazolines from mixtures of Δ²-oxazolines and water comprising:
(a) Delivering in dropwise form the mixture of Δ²-oxazolines and water into the side of a fractionating column containing the vapor of the solvent inert to Δ²-oxazolines wherein the vapor forms an azeotropic mixture with water having a boiling point below the boiling point of both the solvent and the Δ²-oxazolines;
(b) Collecting a mixture of Δ²-oxazolines and solvent in the sump of the fractionating column;
(c) Removing at least a portion of the mixture of Δ²-oxazolines and solvent from the sump; and
(d) Separating the Δ²-oxazolines from the solvent.

---

This invention relates generally to a method of distillation for the separation of Δ²-oxazolines.

An object of the invention is to separate Δ²-oxazolines from mixtures of the Δ²-oxazolines with water.

Another object of the invention is to separate Δ²-oxazolines from mixtures of Δ²-oxazolines, water and unreacted amide resulting from the thermal dehydration of the corresponding N-2-hydroxyethyl derivatives of aliphatic carboxylic acid amides.

The Δ²-oxazolines obtained by this invention are useful directly for polyaddition reactions.

It is known that Δ²-oxazolines can be produced by thermal dehydration of the corresponding N-2-hydroxyethyl derivatives of aliphatic carboxylic acid amides. The resulting reaction mixtures contains, besides the desired Δ²-oxazoline, water and non-reacted amide, together with other possible reaction products. Aliphatic substituted Δ²-oxazolines in the presence of water, or the N-substituted carboxylic acid amides which may be present as initial products, have a tendency toward ring formation. Processing of them by distillation is not advisable because of the heating required. The separation of water from the reaction mixture is rendered difficult by the tendency of some Δ²-oxazolines to form azeotropic mixtures with water. The production of Δ²-oxazolines by thermal dehydration is disclosed in Journal Am. Chem. Soc. 57 (1395), p. 1079, Ber. dtsch. chem. Ges. 93 (1960), p. 3036.

According to the prior art, the reaction mixtures were extracted with ether and the Δ²-oxazolines obtained from the extracts then dried, e.g., with solid alkali hydroxides or by distillation over metallic sodium as disclosed in l.c. J. Am. Chem. Soc (1935), p. 1080, section 3, l.c. Ber. dtsch. chem. Ges., p. 3045, section 4.

These prior art methods are not suitable for technical processing of the reaction mixture because working with metallic sodium requires special safety precautions while dehydration with alkali hydroxides results in some loss of product.

It has been found by the method of the present invention that the water-containing reaction mixtures resulting from the production of Δ²-oxazolines by dehydration of N-hydroxyethyl derivatives of carboxylic acid amides can be advantageously processed if water-containing Δ²-oxazoline is—
(a) Distilled from the reaction mixture under diminished pressure;
(b) The water-containing distillate is then delivered to a fractionating column in which the steam is in the presence of an organic solvent which is inert toward the Δ²-oxazoline but with which water forms an azeotropic mixture which boils below the boiling point of the solvent and below the boiling point of the Δ²-oxazoline; and
(c) Finally the practically water-free mixture of solvent and Δ²-oxazoline which remains in the sump of the column is fractionally distilled.

The process of the present invention is facilitated by reference to the drawing which shows an apparatus suitable therefor with a flow of the process indicated thereon.

Reaction mixtures suitable for this method of processing are those which contain Δ²-oxazolines whose boiling points under normal pressure are between 105 and 250° C.

Δ²-oxazolines suitable for this purpose are those which are liquid or which melt below 100° C. and which may be substituted at one or more places in the ring. Those compounds which carry a substituent in the 2-position consisting of a saturated alkyl group with 1 to 10 carbon atoms, an aryl group or a cycloaliphatic group with 6 to 10 carbon atoms, and where the alkyl group can also be connected to another oxazoline ringe are particularly suitable.

As examples may be mentioned: 2-methyl-, 2,4-, 2,5-dimethyl-, 2-ethyl-, 2-propyl-, 2-butyl-, 2,4,4-trimethyl-, 2-cyclohexyl-, 2-phenyl-, and 4-methyl-2-phenyl-Δ²-oxazoline as well as 1,4-butane-bis-(2-oxazoline).

Particularly suitable are 2-methyl-, 2,5-dimethyl-, 2-ethyl-, 2-propyl- and 2-butyl-Δ²-oxazoline which may be represented by the following formula:

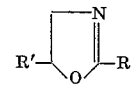

wherein R¹ is hydrogen or a methyl group and R is an alkyl group having 1 to 5 carbon atoms.

The reaction mixtures that are used generally contain 2 to 50 percent by weight of water, preferably 5 to 30% water, 98 to 20%, preferably 5 to 30% Δ²-oxazoline, and more or less of the N-hydroxyethyl-substituted carboxylic acid amide.

The organic solvents which are used in this processing must satisfy the following conditions:
(a) They must not react with the Δ²-oxazoline; and
(b) They must form with water an azeotropic mixture which boils below the boiling point of the solvent and at least 5° C. below the boiling point of the Δ²-oxazoline.

It is preferable to use organic solvents which are not miscible with water, e.g., benzene, toluene, xylene, cyclohexane and gasoline fractions with a suitable boiling point range, e.g., between 90 and 120° C.

For performing this process, the reaction mixture is first separated into a low boiling fraction (1) which contains water and the Δ²-oxazoline and a higher boiling fraction (2) which contains the non-reacted portions of the N-hydroxyethyl-substituted carboxylic acid amide used in preparing the Δ²-oxazoline. If water containing Δ²-oxazoline mixtures were used which did not contain any carboxylic acid amide, then the preliminary fractionation can obviously be omitted.

The distillation is performed at the lowest possible temperatures, preferably between 20 and 100° C., particularly between 20 and 80° C., in order to avoid any reaction of water with the $\Delta^2$-oxazoline. The distillation is therefore generally performed under diminished pressure, usually between 1 and 5 torrs (mm. of Hg), depending on the temperature.

The distillate should be cooled as quickly as possible by collecting it in a cooled receptacle.

The fraction containing water and the $\Delta^2$-oxazoline is delivered to a column which contains the vapor of one of the above-named solvents. The fraction containing water and the $\Delta^2$-oxazoline is introduced in the liquid state, preferably through the side of the column. With $\Delta^2$-oxazolines which are easily hydrolyzable, as e.g. those with 1 to 5 carbon atoms in the alkyl groups, such lateral introduction into the column is necessary, and should be into the upper half of the column.

It is also advantageous to deliver the material in the middle of the cross-section of the column. By lateral introduction into the column a prolonged warming of the water containing $\Delta^2$-oxazoline mixture is avoided so that the yield of $\Delta^2$-oxazoline by ring splitting does not occur. The column is equipped with a dephlegmator (fractionator) or water separator. The azeotropic mixture of water and solvent distills from the head of the column and is separated in the water separator. The layer of solvent can be separated in the dephlegmator and recycled to the solvent in the bottom of the column. The higher boiling $\Delta^2$-oxazoline or the higher boiling $\Delta^2$-oxazoline-solvent mixture sinks to the bottom of the column. The $\Delta^2$-oxazoline-solvent mixture is withdrawn therefrom continuously or in portions and is subjected to further fractionation, preferably under atmospheric pressure, in an adjacent connected column.

The mixture of $\Delta^2$-oxazoline and organic solvent and the crude $\Delta^2$-oxazoline itself which is subjected to fine fractionation generally contains at the most only traces of water.

This method of processing has the advantage that notwithstanding the hydroscopic property of the material and its tendency to undergo hydrolysis, ring splitting of the $\Delta^2$-oxazoline does not occur. The $\Delta^2$-oxazolines thus obtained are generally sufficiently pure to permit their use directly for polyaddition reactions.

In order to produce very pure $\Delta^2$-oxazolines, the fractionation can be performed in the presence of acid chlorides or anhydrides.

Without further elaboration, it is believed that one skilled in the art can, using the preceding description, utilize the present invention to its fullest extent. The following preferred specific embodiments are, therefore, to be constructed as merely illustrative, and not limitative of the remainder of the specification and claims in any way whatsoever.

EXAMPLE 1

207 parts by weight of a reaction mixture obtained by gaseous dehydration of N-2-hydroxyethyl-acetamide at 600° C. under 14 mm. Hg in the presence of an aluminum oxide catalyst are distilled under 2 to 25 mm. Hg pressure in a receptacle cooled to —20° C. The yield is 158 parts by weight of a first fraction (1) which boils to 50° C. under 1 mm. Hg and which contains 61.2% by weight of 2-methyl-$\Delta^2$-oxazoline and 14.7% water, and 41 parts by weight of residue, most of which consists of the starting substance. A typical distillation apparatus is disclosed in Technique of Organic Chemistry, vol. IV, Distillation (1951) p. 477, FIG. 5.

157 parts by weight of the low boiling fraction (1) are added dropwise laterally into a fractionating column. The column which is filled with Raschig rings is 80 cm. long and has its upper end connected to a dephlegmator. The fraction is introduced about 60 cm. above the lower end of the column and near the middle of the latter. The column is connected to a vessel filled with boiling benzene. A typical fractionating column filled with Raschig rings and having a dephlegmator connected to the top and feed near the middle of the column is disclosed in l.c. Technique of Organic Chemistry, vol. IV., pp. 254 to 255, FIGS. 39 and 40.

Soon after the dropwise addition of fraction (1) is commenced, the boiling temperature in the dephlegmator drops from 80° C. to about 65 to 70° C. while drops of water settle in the distillate. After completion of the dropwise addition, 23 parts by weight of water amounting to practically 100% of the water present have separated in the dephlegmator containing about 0.5 part by weight of 2-methyl-$\Delta^2$-oxazoline.

285 parts by weight benzene containing a total of 1.4 parts by weight of 2-methyl-$\Delta^2$-oxazoline are distilled off. An intermediate fraction of 21 parts boiling at 90 to 150° C. then follows, which contains 12 parts 2-methyl-$\Delta^2$-oxazoline. Thereafter 45 parts pure 2-methyl-$\Delta^2$-oxazoline, $n_D^{20}=1.4368$, free from water and benzene, distills at 107 to 110° C. An additional portion of 15 parts pure 2-methyl-$\Delta^2$-oxazoline is obtained by distillation of the material from the sump of the column by means of a small still.

The yield of pure 2-methyl-$\Delta^2$-oxazoline can be greatly increased by using the continuous method of production because in the batch method that has been described, a relatively large amount of oxazoline remains behind in the apparatus.

EXAMPLE 2

In the apparatus that was described in Example 1, the dephlegmator is now substituted by a water separator as disclosed in l.c. Techn. of Org. Chem., vol. IV, p. 373, FIG. 27. In a solvent-containing distillation vessel 88 parts by weight of benzene are heated to the boiling point and 47 parts pure 2-methyl-$\Delta^2$-oxazoline and 47 parts water are then added dropwise through a funnel.

From the water separator 47 parts of an aqueous layer containing 0.2 part 2-methyl-$\Delta^2$-oxazoline are separated. The benzene is then distilled off, together with 2.6 parts by weight of 2-methyl-$\Delta^2$oxazoline. Finally 33 parts by weight of pure 2-methyl-$\Delta^2$-oxazoline boiling at 107 to 109° C. are obtained. In the batch method some of the oxazoline would remain behind, clinging to the inside of the column, but by the continuous method the yield can be increased by that amount.

EXAMPLE 3

The reaction mixture that was obtained by gaseous dehydration of 2-hydroxyethyl-butyramide as in Example 1 is separated from the starting material by distillation from a distillation apparatus having a bottom flask submerged in an oil bath with a temperature up to 100° C. into a receptacle that cooled to 0° C. under a pressure of 1 mm. Hg.

From 158 parts by weight of the distillate, which contains 116 parts 2-propyl-$\Delta^2$-oxazoline and 42 parts water, 21 parts of the aqueous layer containing 3 parts 2-propyl-$\Delta^2$-oxazoline are separated in a fractionation column as in Example 1. The benzene is then distilled off and the material from the sump of the column is distilled under normal pressure in a small still. The yield is 11 parts by weight of a preliminary product of benzene and 2-propyl-$\Delta^2$-oxazoline boiling at 95 to 145° C., and then 104 parts 2-propyl-$\Delta^2$-oxazoline boiling at 145 to 150° C.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A method of separating $\Delta^2$-oxazolines from mixtures of $\Delta^2$-oxazoline and water and from mixtures of $\Delta^2$-oxazolines, water and N-hydroxyethyl derivatives of carboxylic acid amides resulting from the dehydration of N-hydroxyethyl derivatives of carboxylic acid amides comprising:

(a) distilling said mixtures under reduced pressure;

(b) separating a distillate comprising $\Delta^2$-oxazolines and water;

(c) delivering said distillate of (b) to a fractionating column containing the vapor of a solvent inert to $\Delta^2$-oxazolines, said vapor forming an azeotropic mixture with water, said azeotropic mixture having a boiling point below the boiling point of said solvent and said $\Delta^2$-oxazolines;

(d) separating a mixture of said $\Delta^2$-oxazolines and said solvent; and (e) distilling and separating said mixture of $\Delta^2$-oxazolines and solvent.

2. A method of separating $\Delta^2$-oxazolines comprising:

(a) distilling under a reduced pressure a mixture of water and $\Delta^2$-oxazolines selected from the group consisting of 2-methyl-$\Delta^2$-oxazoline, 2,5-dimethyl-$\Delta^2$-oxazoline 2,4-dimethyl-$\Delta^2$-oxazoline, 2-ethyl-$\Delta^2$-oxazoline, 2-propyl-$\Delta^2$-oxazoline, 2-butyl-$\Delta^2$-oxazoline, 2,4,4 - trimethyl - $\Delta^2$-oxazoline, 2-cyclohexyl-$\Delta^2$-oxazoline, 2-phenyl-$\Delta^2$-oxazoline, 4-methyl-2-phenyl-$\Delta^2$-oxazoline, 1,4-butane-bis-(2-oxazoline) and mixtures thereof;

(b) separating a distillate comprising said $\Delta^2$-oxazolines and water;

(c) delivering said distillate of (b) to a fractionating column containing the vapor of a solvent selected from the group consisting of benzene, toluene, xylene, cyclohexane, gasoline fractions with a boiling point between 90 and 120° C. and mixtures thereof;

(d) separating a mixture of said $\Delta^2$-oxazolines and said solvent; and (e) distilling and separating said mixture of $\Delta^2$-oxazolines and solvent.

3. A method of separating $\Delta^2$-oxazolines comprising:

(a) delivering a mixture of water and $\Delta^2$-oxazolines selected from the group consisting of 2-methyl-$\Delta^2$-oxazoline, 2,5-dimethyl-$\Delta^2$-oxazoline, 2,4-dimethyl-$\Delta^2$ - oxazoline, 2 - ethyl - $\Delta^2$-oxazoline, 2-propyl-$\Delta^2$-oxazoline, 2 - butyl-$\Delta^2$-oxazoline, 2,4,4-trimethyl-$\Delta^2$-oxazoline, 2 - cyclohexyl - $\Delta^2$-oxazoline, 2-phenyl-$\Delta^2$-oxazoline, 4 - methyl - 2 - phenyl-$\Delta^2$-oxazoline, 1,4-butane-bis-(2-oxazoline) and mixtures thereof to a fractionating column containing the vapor of a solvent selected from the group consisting of benzene, toluene, xylene, cyclohexane, gasoline fractions with a boiling point between 90 and 120° C. and mixtures thereof;

(b) separating a mixture of said $\Delta^2$-oxazolines and said solvent; and (c) distilling and separating said mixture of $\Delta^2$-oxazolines and solvent.

4. A continuous process of separating $\Delta^2$-oxazolines from mixtures of $\Delta^2$-oxazolines and water and from mixtures of $\Delta^2$-oxazolines, water and N-hydroxyethyl derivatives of carboxylic acid amides resulting from the dehydration of N-hydroxyethyl derivatives of carboxylic acid amides comprising:

(a) distilling said mixtures under reduced pressure;

(b) separating a distillate comprising $\Delta^2$-oxazolines and water;

(c) delivering said distillate of (b) to a fractionating column containing the vapor of a solvent inert to $\Delta^2$-oxazolines, said vapor forming an azeotropic mixture with water, said azeotropic mixture having a boiling point below the boiling point of said solvent and said $\Delta^2$-oxazolines;

(d) collecting a mixture of said $\Delta^2$-oxazolines and said solvent in the sump of said fractionating column of (c);

(e) collecting said azeotropic mixture in a water separator at the head of said fractionating column of (c);

(f) separating said solvent from said azeotropic mixture and returning said solvent to said sump of (d);

(g) removing at least a portion of said mixture of $\Delta^2$-oxazolines and solvent from said sump of (d); and (h) distilling and separating said mixture of $\Delta^2$-oxazolines and solvent.

5. A method of separating $\Delta^2$-oxazolines from mixtures of $\Delta^2$-oxazolines and water and from mixtures of $\Delta^2$-oxazolines, water and N-hydroxyethyl derivatives of carboxylic acid amides resulting from the dehydration of N-hydroxyethyl derivatives of carboxylic acid amides comprising:

(a) distilling said mixtures under a pressure of about 1 to 50 mm. of mercury and at about 20 to 100° C.;

(b) separating a distillate comprising $\Delta^2$-oxazolines and water;

(c) delivering in dropwise form said distillate of (b) to a fractionating column containing the vapor of a solvent inert to $\Delta^2$-oxazolines having a boiling point between 90 and 120° C., said vapor forming an azeotropic mixture having a boiling point below the boiling point of said solvent and said $\Delta^2$-oxazolines;

(d) separating a mixture of said $\Delta^2$-oxazolines and said solvent; and (e) distilling and separating said mixture of $\Delta^2$-oxazolines and solvent.

6. The method of claim 5 wherein step (a) is carried out at a temperature of about 20 to 80° C., said distillate of (b) is delivered through the side of the fractionation column of (c), into the middle of the horizontal cross section of said column and into the upper half of said column.

7. The method of claim 5, wherein said mixture of (a) is 2-methyl-$\Delta^2$-oxazoline, water and the residue of the dehydration of N-2-hydroxyethyl acetamide.

8. The method of claim 6, wherein said $\Delta^2$-oxazolines are selected from the group consisting of 2-methyl-$\Delta^2$-oxazoline, 2,5-dimethyl-$\Delta^2$-oxazoline, 2-ethyl-$\Delta^2$-oxazoline, 2-propyl-$\Delta^2$-oxazoline and 2-butyl-$\Delta^2$-oxazoline.

References Cited

UNITED STATES PATENTS

| | | | |
|---|---|---|---|
| 2,372,409 | 3/1945 | Tryon | 260—307.6 |
| 2,817,663 | 12/1957 | Conlon et al. | 260—307.6 |
| 2,844,589 | 7/1958 | Hessq | 260—307.6 |
| 3,105,019 | 9/1963 | Murray et al. | 203—69 |
| 3,128,295 | 4/1964 | Wehrmeister | 260—307.6 |
| 3,219,547 | 11/1965 | Wheeler | 203—77 |
| 3,235,557 | 2/1966 | Wiggins | 260—307.6 |

WILBUR L. BASCOMB, Jr., *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,402,107                              September 17, 1968

Wolfgang Seeliger et al.

It is certified that error appears in the above identified patent and that said Letters Patent are hereby corrected as shown below:

Column 3, line 3, "between 1 and 5 torrs" should read -- between 1 and 50 Torr --.

Signed and sealed this 10th day of February 1970.

(SEAL)
Attest:

Edward M. Fletcher, Jr.                        WILLIAM E. SCHUYLER, JR.
Attesting Officer                                       Commissioner of Patents